US009524545B2

(12) United States Patent
Fukase

(10) Patent No.: US 9,524,545 B2
(45) Date of Patent: Dec. 20, 2016

(54) APPARATUS, SYSTEM, METHOD AND STORAGE MEDIUM FOR IMAGE INSPECTION RESULT DETERMINATION AND VERIFYING FALSE DEFECT DETECTIONS DUE TO POSITION MATCHING ERRORS

(71) Applicant: Takahiro Fukase, Kanagawa (JP)

(72) Inventor: Takahiro Fukase, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 222 days.

(21) Appl. No.: 14/486,900

(22) Filed: Sep. 15, 2014

(65) Prior Publication Data
US 2015/0078627 A1    Mar. 19, 2015

(30) Foreign Application Priority Data

Sep. 17, 2013    (JP) ................................. 2013-191612

(51) Int. Cl.
G06T 7/00 (2006.01)
B41F 33/00 (2006.01)
(Continued)

(52) U.S. Cl.
CPC ............ G06T 7/001 (2013.01); *B41F 33/0036* (2013.01); *G06K 9/036* (2013.01);
(Continued)

(58) Field of Classification Search
None
See application file for complete search history.

(56) References Cited

U.S. PATENT DOCUMENTS 6,865,288 B1 *    3/2005   Shishido ................. G06T 7/001
                                                              382/141
7,508,973 B2 *    3/2009   Okabe ................... G06T 7/0004
                                                              382/144
(Continued)

FOREIGN PATENT DOCUMENTS

JP        2004-195878        7/2004
JP        2011-114574        6/2011
(Continued)

OTHER PUBLICATIONS

U.S. Appl. No. 14/191,935, filed Feb. 27, 2014.
U.S. Appl. No. 14/206,066, filed Mar. 12, 2014.
U.S. Appl. No. 14/212,562, filed Mar. 14, 2014.

*Primary Examiner* — Siamak Harandi
*Assistant Examiner* — Pinalben Patel
(74) *Attorney, Agent, or Firm* — Duft Bornsen & Fettig LLP

(57) ABSTRACT

An apparatus for verifying an inspection result includes an inspection result obtaining unit to obtain inspection result indicating defect amount and defect position in a scanned image, from an inspection result of defect judgment of the scanned image with respect to an inspection reference image, the defect judgment being performed through dividing at least one of the scanned image and the inspection reference image and conducting position matching of the scanned image and inspection reference image; and a verification unit to count defect amount occurring to the scanned image, to determine whether a defect pattern occurring to the scanned image matches a pre-set condition corresponding to a false detection condition causable by failure of the position matching, and to determine that defect occurring to the scanned image is a false detection when the counted defect amount is a threshold or more, and the defect pattern matches the false detection condition.

9 Claims, 10 Drawing Sheets

(51) Int. Cl.
  *G06K 9/03* (2006.01)
  *H04N 1/00* (2006.01)
(52) U.S. Cl.
  CPC ........... *G06T 2207/10008* (2013.01); *G06T 2207/20021* (2013.01); *G06T 2207/30144* (2013.01); *H04N 1/00002* (2013.01)

(56) References Cited

U.S. PATENT DOCUMENTS

| | | | |
|---|---|---|---|
| 9,088,745 B2 * | 7/2015 | Kitai | H04N 1/4092 |
| 2002/0114506 A1 * | 8/2002 | Hiroi | G01N 21/95684 |
| | | | 382/149 |
| 2004/0052410 A1 * | 3/2004 | Yasukawa | G06T 7/001 |
| | | | 382/141 |
| 2006/0115143 A1 * | 6/2006 | Auerbach | G01N 21/95607 |
| | | | 382/149 |
| 2012/0002861 A1 * | 1/2012 | Nishiura | G06K 9/6255 |
| | | | 382/149 |
| 2012/0229618 A1 * | 9/2012 | Urano | G01N 21/9501 |
| | | | 348/92 |

FOREIGN PATENT DOCUMENTS

| | | |
|---|---|---|
| JP | 2012-108854 | 6/2012 |
| JP | 2012-232510 | 11/2012 |
| JP | 2013-036815 | 2/2013 |

* cited by examiner

MASTER IMAGE    SCANNED IMAGE

```
DEFECT ID                  : def00x
JOB ID                     : job00x
PAGE NUMBER                : page00x DEFECT POSITION            : Xxxx, Yxxx
DEFECT AREA                : XX
AVERAGE DIFFERENCE VALUE   : XX
MAXIMUM DIFFERENCE VALUE   : XX
ASPECT RATIO               : XX : XX

. . .
```

✕ : DEFECT JUDGMENT PORTION

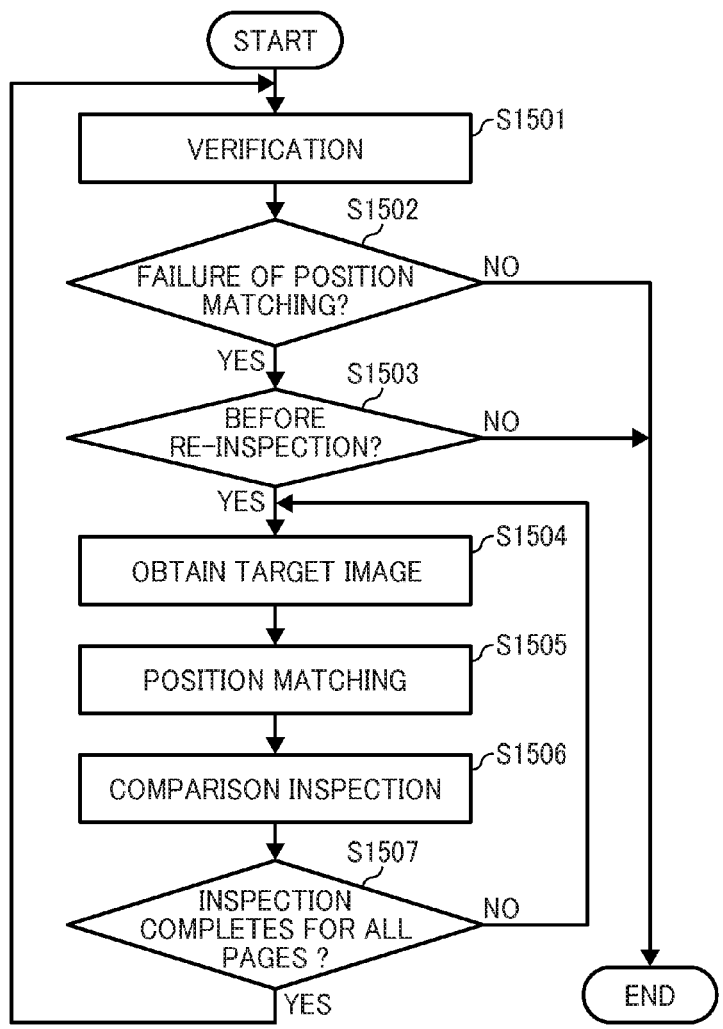

APPARATUS, SYSTEM, METHOD AND STORAGE MEDIUM FOR IMAGE INSPECTION RESULT DETERMINATION AND VERIFYING FALSE DEFECT DETECTIONS DUE TO POSITION MATCHING ERRORS

CROSS-REFERENCE TO RELATED APPLICATION

This application claims priority pursuant to 35 U.S.C. §119(a) to Japanese Patent Application No. 2013-191612, filed on Sep. 17, 2013 in the Japan Patent Office, the disclosure of which are incorporated by reference herein in their entirety.

BACKGROUND

1. Technical Field

The present invention relates to an image inspection result determination apparatus, an image inspection system, and an image inspection result determination method, and more particularly to determination of failure of position matching for an image comparison inspection.

2. Background Art

Conventional inspections of printed products such as printed papers are conducted by visual inspection, but inspection apparatuses have been introduced to conduct the inspection as a post-processing operation of an offset printing. As to the inspection apparatus, the printed products are visually inspected by an operator to select a printed product having satisfactory image quality, and then the selected printed product is scanned to generate a master image, which is to be used as a reference image for the inspection. A portion of the master image and a corresponding portion of inspection target image (i.e., printed product) are compared with each other by scanning the inspection target image. Based on difference between the master image and the inspection target image, defect of the inspection target image can be determined.

Printing apparatuses of digital type, not using a press plate, such as image forming apparatuses using electrophotography typically print images with a small volume, and also print different images for each page (i.e., variable printing), in which generation of a master image from a printed product as a reference image is not efficient. In this type of image forming apparatuses, the master image can be generated from print data to efficiently conduct the inspection for the variable printing.

Further, to enhance precision this comparison inspection, a pattern recognized in a scanned image and a pattern recognized in a master image can be used to conduct a position matching of these two images.

However, even if the position matching is conducted, the position matching may not be conducted correctly. For example, when the same image pattern is repeatedly drawn, the above position matching method may conduct false position matching. If a comparison inspection is conducted under a condition of false position matching, each pixel is compared under a condition that the master image and the scanned image are deviated, in which the scanned image is determined as defect.

SUMMARY

In one aspect of the present invention, an apparatus for verifying an inspection result of a scanned image generated by scanning an image printed on a sheet is devised. The apparatus includes an inspection result obtaining unit to obtain inspection result information indicating defect amount and defect position in the scanned image, from an inspection result of defect judgment of the scanned image with respect to an inspection reference image, the defect judgment being performed through dividing at least one of the scanned image and the inspection reference image into a plurality of areas and conducting position matching for each of the areas; and a verification unit to count defect amount occurring to the scanned image for each of the plurality of areas based on the obtained inspection result information, to determine whether a defect pattern occurring to the scanned image matches a pre-set condition corresponding to a false defect detection condition causable by failure of the position matching, and to determine that defect occurring to the scanned image is a false detection caused by failure of the position matching when the counted defect amount for each of the areas is a pre-set threshold value or more, and the defect pattern occurring to the scanned image matches the false defect detection condition.

In another aspect of the present invention, an image inspection system is devised. The image inspection system includes a scanned image obtaining unit to obtain a scanned image generated by scanning an image printed on a sheet; an inspection reference image generator to generate an inspection reference image as a master image, the master image to be used for an inspection of the scanned image based on information of to-be-printed image; a position matching unit to divide at least one of the master image and the scanned image into a plurality of areas to conduct position matching for the master image and the scanned image for the divided each of the areas; an inspection result processing unit to store an inspection result of defect judgment of the scanned image based on difference of the master image and the scanned image in a storage area; an inspection result obtaining unit to obtain inspection result information indicating defect amount and defect position in the scanned image from the inspection result; and a verification unit to count defect amount occurring to the scanned image for each of the areas based on the obtained inspection result information to generate a first verification result, to determine whether a defect pattern occurring to the scanned image matches a pre-set condition corresponding to a false defect detection condition causable by failure of the position matching to generate a second verification result, and to determine that defect occurring to the scanned image is a false detection caused by failure of the position matching, when the first verification result indicates that the counted defect amount for each of the areas is a pre-set threshold value or more, and the second verification result indicates that the defect pattern occurring to the scanned image matches the false defect detection condition.

In another aspect of the present invention, a method of verifying an inspection result of a scanned image generated by scanning an image printed on a sheet is devised. The method includes obtaining inspection result information indicating defect amount and defect position in the scanned image, from an inspection result of defect judgment of the scanned image with respect to an inspection reference image, the defect judgment being performed through dividing at least one of the scanned image and the inspection reference image into a plurality of areas and conducting position matching for each of the areas; counting defect amount occurring to the scanned image for each of the areas based on the obtained inspection result information; determining whether a defect pattern occurring to the scanned image matches a pre-set condition corresponding to a false defect detection condition causable by failure of the position matching; and determining that defect occurring to the scanned image is a false detection caused by failure of the position matching when the counted defect amount for each of the areas is a pre-set threshold value or more, and the defect pattern occurring to the scanned image matches the false defect detection condition.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is an example of defect determination result of page added with flag information; and FIG. 15 is a flowchart showing the steps of a re-inspection operation according to an example embodiment.

Figure 1:
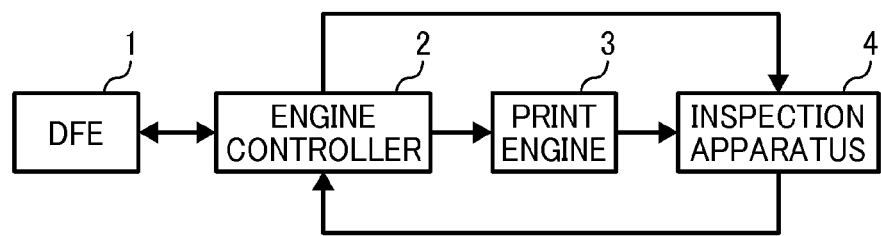
FIG. 1 is a configuration of an image forming system including an inspection apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that have a similar function, operate in a similar manner, and achieve a similar result. Referring now to the drawings, apparatuses or systems according to example embodiments are described hereinafter with reference to drawings.

In this disclosure, an image inspection system inspects a result of an output image by comparing a master image and a scanned image generated by scanning the output image, which is output by an image forming operation, in which the image inspection system can determine whether a judgment result indicating an image has defect (i.e., defect image) is caused by an actual defect, or is not caused by an actual defect but caused by failure of the position matching of the scanned image and the master image. FIG. 1 is an example configuration of an image forming system according to an example embodiment. As illustrated in FIG. 1, the image forming system includes, for example, a digital front end (DFE) 1, an engine controller 2, a print engine 3, and an inspection apparatus 4.

Upon receiving a print job, the DFE 1 generates bitmap data, which is image data to be output (i.e., output-target image), and outputs the generated bitmap data to the engine controller 2. Based on the bitmap data received from the DFE 1, the engine controller 2 controls the print engine 3 to conduct an image forming operation. Further, the engine controller 2 transmits the bitmap data received from the DFE 1 to the inspection apparatus 4, wherein the bitmap data is used as data of original information for preparing an inspection reference image (i.e., master image) to be used for inspection at the inspection apparatus 4 when the inspection apparatus 4 inspects an output result of an image forming operation conducted by the print engine 3.

Under the control of the engine controller 2, the print engine 3 conducts an image forming operation on a recording medium such as paper based on the bitmap data, in which the print engine 3 can be used as an image forming apparatus. The recording medium can be, for example, a sheet such as paper, film, plastic sheet, and any material that can be used to be output with an image by conducting the image forming operation. Based on the bitmap data input from the engine controller 2, the inspection apparatus 4 generates a master image as an inspection reference image. Then, the inspection apparatus 4 compares a scanned image data, generated by scanning the recording medium output by the print engine 3, using a scanning unit, and the generated master image to conduct an image inspection of output image, in which the inspection apparatus 4 can be used as an image inspection apparatus.

When the inspection apparatus 4 judges that an output result has defect by comparing the master image and the scanned image, information of a page judged as having defect is reported to the engine controller 2. Then, the engine controller 2 conducts a re-printing control for a defect-detected page. In the example embodiment of the present invention, the inspection apparatus 4 can determine whether the judgment result indicating that an image has defect, judged by the inspection operation, is caused by an actual defect in image, or caused by deviation of position matching of the master image and the scanned image.

Figure 2:
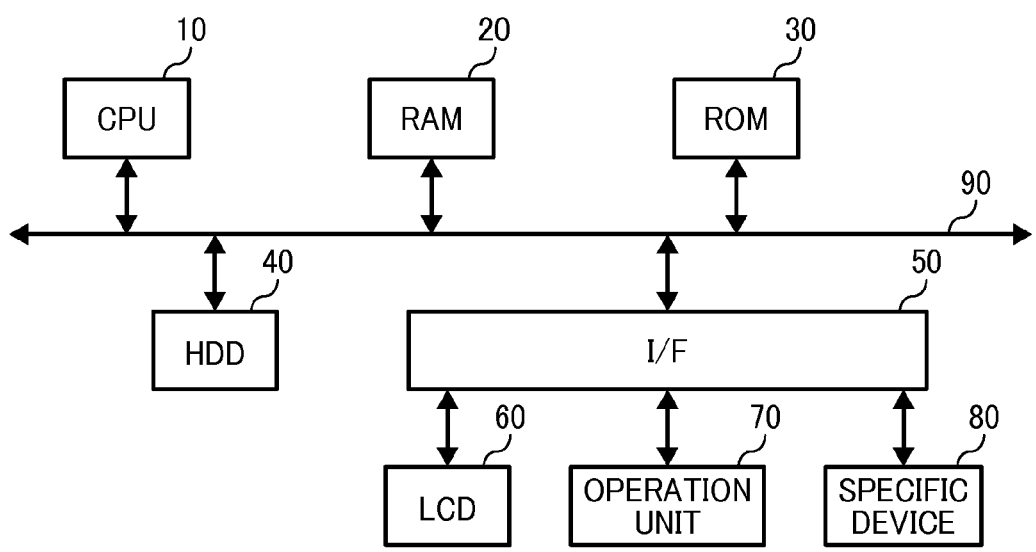
FIG. 2 is a block diagram of a hardware configuration of an inspection apparatus according to an example embodiment.

A description is given of a hardware configuration of the engine controller 2, the print engine 3 and the inspection apparatus 4 according to the example embodiment with reference to FIG. 2. FIG. 2 is a block diagram of an example hardware configuration of the inspection apparatus 4. The engine controller 2 and the print engine 3 can employ a hardware configuration similar to the inspection apparatus 4 illustrated in FIG. 2.

As illustrated in FIG. 2, the inspection apparatus 4 can be configured similarly to information processing apparatuses such as general servers, personal computers (PC) or the like. Specifically, the inspection apparatus 4 includes, for example, a central processing unit (CPU) 10, a random access memory (RAM) 20, a read only memory (ROM) 30, a hard disk drive (HDD) 40, and an interface (I/F) 50, which are connectable with each other via a bus 90. Further, the I/F 50 is connectable to a liquid crystal display (LCD) 60, an operation unit 70, and a specific device 80.

The CPU 10 is a computing processor or unit which controls the inspection apparatus 4 as a whole. The CPU 10 can be configured with various types of processors, circuits, or the like such as a programmed processor, a circuit, and an application specific integrated circuit (ASIC) used singly or in combination. The RAM 20 is a volatile memory, to which data or information can be written and read at high speed, and can be used as a working memory when the CPU 10 processes data or information. The ROM 30 is a non-volatile memory used as a read only memory, and stores programs such as firmware or the like. The HDD 40 is a non-volatile storage device, to which data or information can be written and read, and stores operating system (OS), management or control software programs, application software programs, various data or the like.

The I/F 50 can be used to connect various types of hardware and network to the bus 90, and controls such connection. The LCD 60 is a user interface to display information, with which the status of the inspection apparatus 4 can be checked visually by a user. The operation unit 70 is a user interface such as a keyboard, a mouse, etc., with which information can be input to the inspection apparatus 4 by the user.

The specific device 80 may be disposed as a hardware to conduct specific capability or function for each of the engine controller 2, the print engine 3 and the inspection apparatus 4. For example, as to the print engine 3, the specific device 80 may be a plotter including a transport unit that transports sheets to which an image is output and formed, and the plotter conducts an image forming operation on sheets. Further, as to the engine controller 2 and the inspection apparatus 4, the specific device 80 may be a specific computing circuit to conduct high speed image processing, in which the specific device 80 may be, for example, an application specific integrated circuit (ASIC). Further, the specific device 80 may be a scanner to scan images output on sheets.

In the above described hardware configuration, software programs stored in a storage medium such as the ROM 30, the HDD 40, or an optical disk can be read and loaded to the RAM 20, and the CPU 10 executes such programs to control various units, with which a software-executing controller can be configured. With a combination of such software-executing controller and hardware, a functional block to operate the engine controller 2, the print engine 3, and the inspection apparatus 4 can be configured. In the example embodiment, at least one of these units is implemented as hardware or as a combination of hardware and software.

Figure 3:
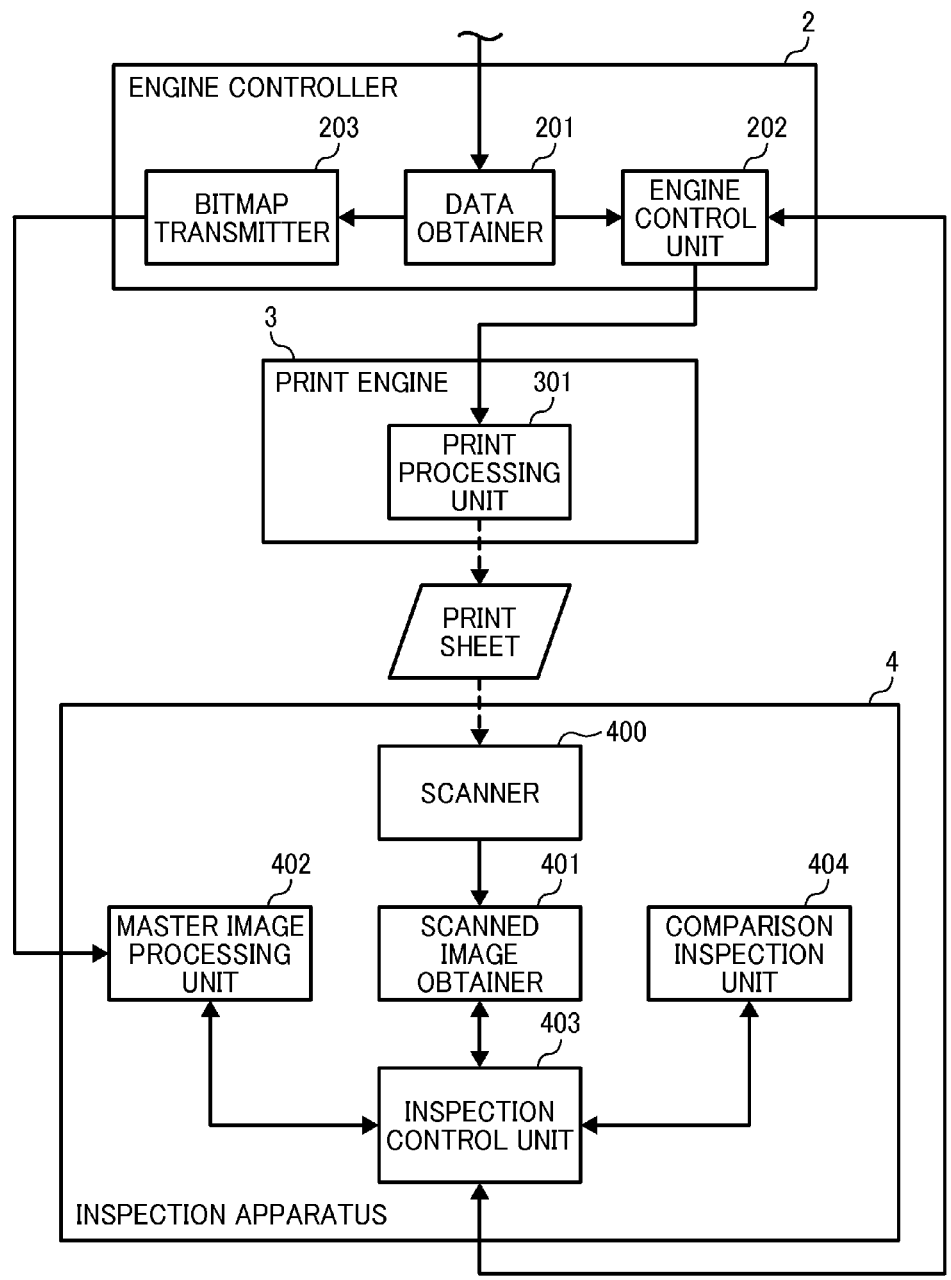
FIG. 3 is a block diagram of functional configuration an engine controller, a print engine, an inspection apparatus and a post-processing apparatus according to an example embodiment.

FIG. 3 is an example block diagram of functional configuration of the engine controller 2, the print engine 3 and the inspection apparatus 4. In FIG. 3, transmission and reception of data is indicated by a solid line, and a flow of sheet is indicated by a dot line. As illustrated in FIG. 3, the engine controller 2 includes, for example, a data obtainer 201, an engine control unit 202, and a bitmap transmitter 203. Further, the print engine 3 includes, for example, a print processing unit 301. Further, the inspection apparatus 4 includes, for example, a scanner 400, a scanned image obtainer 401, a master image processing unit 402, an inspection control unit 403 including a reference point extraction unit 431 to be described later, and a comparison inspection unit 404.

Upon obtaining the bitmap data from the DFE 1 by the data obtainer 201, the engine control unit 202 and the bitmap transmitter 203 are operated. The bitmap data is information of pixels composing an image to be output by an image forming operation. Based on the bitmap data transferred from the data obtainer 201, the engine control unit 202 instructs the print engine 3 to conduct an image forming operation. The bitmap transmitter 203 transmits the bitmap data, obtained by the data obtainer 201, to the inspection apparatus 4 to generate a master image.

The print processing unit 301 obtains the bitmap data input from the engine controller 2, conducts an image forming operation to a sheet, and outputs a printed sheet, in which the print processing unit 301 can function as an image forming unit. The print processing unit 301 may use an image forming mechanism employing electrophotography, but can use other image forming mechanism such as an inkjet method.

The scanner 400 scans an image formed on the sheet formed by conducting an image forming operation such as a printing operation by the print processing unit 301, and outputs scanned data, in which the scanner 400 can function as an image scanner. The scanner 400 is, for example, a line scanner disposed along a transport route of sheet, output by the print processing unit 301, in the inspection apparatus 4, in which the scanner 400 scans the transported sheet face to read an image formed on the sheet. The scanned image generated by the scanner 400 is used as an inspection target image at the inspection apparatus 4. Because the scanned image is generated by scanning the sheet output by the image forming operation, the scanned image indicates a result of output image.

The scanned image obtainer 401 obtains the scanned image data, generated by scanning the sheet face by using the scanner 400. The scanned image data obtained by the scanned image obtainer 401 is input to the inspection control unit 403 for a comparison inspection. The scanned image data is input to the comparison inspection unit 404 under the control of the inspection control unit 403, in which the inspection control unit 403 obtains the scanned image data, and inputs the scanned image data, used as an inspection target image, to the comparison inspection unit 404.

As described above, the master image processing unit 402 obtains the bitmap data input from the engine controller 2, and generates a master image as an inspection reference image, which is to be compared with the inspection target image. Therefore, the master image processing unit 402 can be used as an inspection reference image generator that generates the master image as the inspection reference image to be used for inspecting the scanned image based on the output-target image.

The inspection control unit 403 is a control unit that controls the inspection apparatus 4 as a whole, and thereby each unit in the inspection apparatus 4 is operated under the control of the inspection control unit 403. Further, the inspection control unit 403 analyzes the scanned image data obtained from the scanned image obtaining unit 401, and based on the analysis result, the inspection control unit 403 inputs information of correction value, used for correcting the master image, to the master image processing unit 402.

Under the control of the inspection control unit 403, the comparison inspection unit 404 is used as an image inspection unit that compares the scanned image data input from the scanned image obtainer 401, and the master image generated by the master image processing unit 402 to determine whether a desired image forming operation is conducted. The comparison inspection unit 404 may be configured with the above mentioned ASIC or the like so that greater amount of data can be computed or processed with high speed.

The comparison inspection unit 404 compares the scanned image data and the master image expressed with 8-bit for each of RGB (total 24 bits) as described above for each corresponding pixel, and computes difference of pixel values for each of RGB for each pixel. Based on comparison of the computed difference value and a given threshold, the inspection control unit 403 determines whether a defect occurs to the scanned image data. Therefore, the comparison inspection unit 404 can function as an image inspection unit to determine defect of the scanned image data based on difference of the inspection reference image and the scanned image. The comparison process of the scanned image and master image will be described later.

Figure 4:
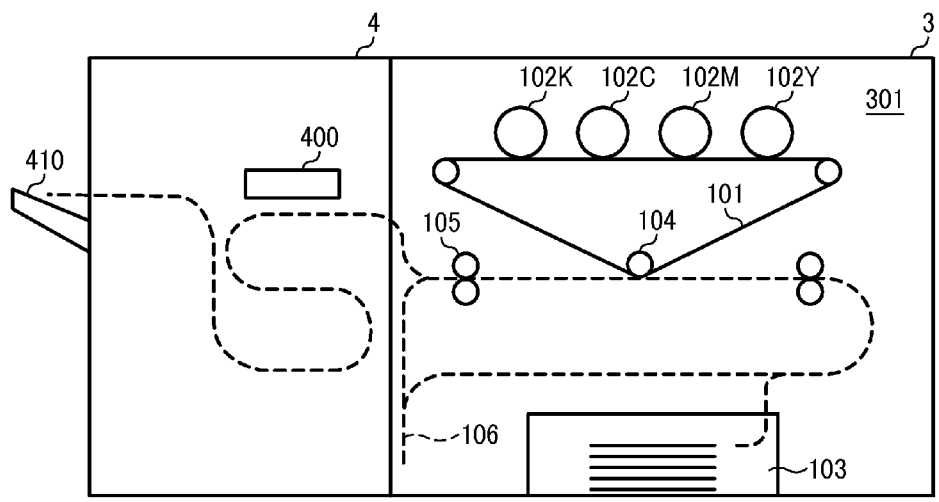
FIG. 4 is a configuration of a print engine according to an example embodiment.

A description is given of a mechanical configuration of the print engine 3 and the inspection apparatus 4 with reference to FIG. 4. As illustrated in FIG. 4, the print processing unit 301 includes, for example, photoconductor drums 102Y, 102M, 102C, 102K for each color (hereinafter, photoconductor drum 102) disposed along a transport belt 101 used as an endless movement unit, which is known as a tandem type. The transport belt 101 is used as an intermediary transfer belt to form an intermediary transfer image to be transferred to a recording medium such as a sheet supplied form a sheet feed tray 103. A plurality of the photoconductor drums 102Y, 102M, 102C, 102K is disposed along the transport belt 101 from an upstream of a transport direction of the transport belt 101.

Toner images of each of colors developed on each of the photoconductor drums 102 using corresponding toner are superimposed and transferred on the transport belt 101 to form a full color image on the transport belt 101. The full color image formed on the transport belt 101 is transferred to a sheet transported on a sheet transport path (see a dot line in FIG. 4) by a transfer roller 104 at the nearest position where the transport belt 101 comes near the sheet transport path.

The image-transferred sheet is further transported on the sheet transport path, and the image is fused by a fusing roller 105, and then sheet is further transported to the inspection apparatus 4. Further, when the duplex printing is conducted, the sheet 104 having the fused image is transported to an inverting route 106 to invert the faces of the sheet, and then the sheet is transported to the transfer position of the transfer roller 104 again.

Figure 5:
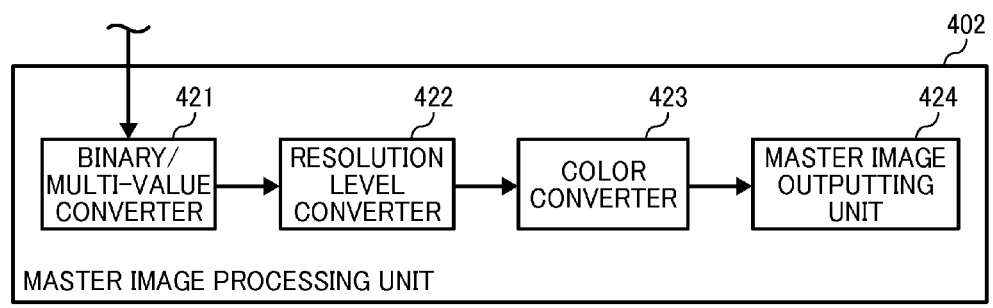
FIG. 5 is a block diagram of functional configuration of a master image processing unit according to an example embodiment functional configuration.

The scanner 400 scans a face of sheet transported from the print processing unit 301 in the sheet transport path inside the inspection apparatus 4 to generate a scanned image, and outputs the scanned image to the scanned image obtaining unit 401 of the inspection apparatus 4, which can be used as the information processing apparatus. Further, the sheet scanned by the scanner 400 is further transported in the inspection apparatus 4, and ejected to a sheet ejection tray 410. In a configuration of FIG. 4, the scanner 400 is disposed at one side of sheet in the sheet transport inside the inspection apparatus 4, but the scanner 400 can be disposed at both sides of sheet in the sheet transport path to inspect both faces of sheet A description is given of the master image processing unit 402 with reference to FIG. 5. FIG. 5 is an example block diagram of functional configuration of the master image processing unit 402. As illustrated in FIG. 5, the master image processing unit 402 includes, for example, a binary/multi-value converter 421, a resolution level converter 422, a color converter 423, and an image outputting unit 424. The master image processing unit 402 can be devised as the specific device 80 (see FIG. 2) devised by a combination of hardware and software such as the ASIC controlled by software.

The binary/multi-value converter 421 conducts a binary/multi-value converting process to a binary format image expressed binary such as color/non-color to generate a multi-valued image. Information input to the print engine 3 can be referred to as variable data because print data is generated for each page in digital printing. The print engine 3 conducts an image forming operation based on binary format image for each color such as cyan, magenta, yellow, and black (CMYK). Because the scanned image data, which is an inspection target image, is a multi-valued image composed of multi-gradient image of the three primary colors of red, green and blue (RGB), a binary format image is initially converted to a multi-valued image by the binary/multi-value converter 421. The multi-valued image is, for example, an image expressed by 8-bit for each CMYK.

Further, the print engine 3 conducts an image forming operation based on binary format image for each of CMYK, and the master image processing unit 402 includes the binary/multi-value converter 421 but not limited hereto. For example, when the print engine 3 conducts an image forming operation based on a multi-valued image, the binary/multi-value converter 421 can be omitted.

The resolution level converter 422 conducts a resolution level conversion process to match a resolution level of multi-valued image generated by the binary/multi-value converter 421 to a resolution level of the scanned image data (i.e., inspection target image). Because the scanner 400 generates scanned image data, for example, with the resolution level of 200 dots per inch (dpi), the resolution level converter 422 converts a resolution level of a multi-valued image generated by the binary/multi-value converter 421 to 200 dpi.

The color converter 423 obtains the image having converted with the resolution level by the resolution level converter 422 and conducts a color converting process. Because the scanned image data is RGB-format image as described above, the color converter 423 converts the CMYK-format image having converted with the resolution level by the resolution level converter 422 to the RGB-format image, with which a multi-valued image of 200 dpi expressed with 8-bit for each of RGB for each pixel (total of 24 bits) is generated. This multi-valued image can be used as a master image of variable data.

Further, the color converter 423 conducts color adjustment processing to adjust color of variable data, which is digital data, to color of an image generated by scanning a sheet face by the scanner 400. The color adjustment processing of color can be conducted by converting pixel value of the variable data converted from CMYK format to RGB format as above described by referring a table correlating RGB value of variable data (i.e., input data) and RGB value of color of an image generated by the scanner 400.

The above mentioned table, referred to as "color conversion table" correlating RGB value of variable data (i.e., input data) and RGB value of color of an image generated by the scanner 400 can be generated as follows. For example, a plurality of color patches of various colors (i.e., different density) used as gradation-correction-use image is output onto a sheet by using the print processing unit 301, and a sheet face formed with the gradation-correction-use image is scanned by the scanner 400. As to the scanned image of color patch generated by the scanning process (i.e., scanned image of gradation-correction-use image), pixel value at position of each color patch, and pixel value of each color patch of original data (i.e., CMYK gradation value of each color patch of original data) are correlated and stored to generate the "color conversion table." This processing can be conducted by the inspection control unit 403, which means the inspection control unit 403 can function as a color conversion information generator.

The color conversion table based on the color patches can be generated, for example, when one print job is to be started, with which a table can be generated by including printing conditions and scanning conditions when a print job is to be conducted. Further, the above mentioned scanned image of gradation-correction-use image may include a blank portion not displaying a patch. A pixel value of the blank portion of the scanned image of gradation-correction-use image can be used for a blank portion determination processing to be described later. The image outputting unit 424 inputs a master image generated by the process up to the color converter 423 to the inspection control unit 403.

Figure 6:
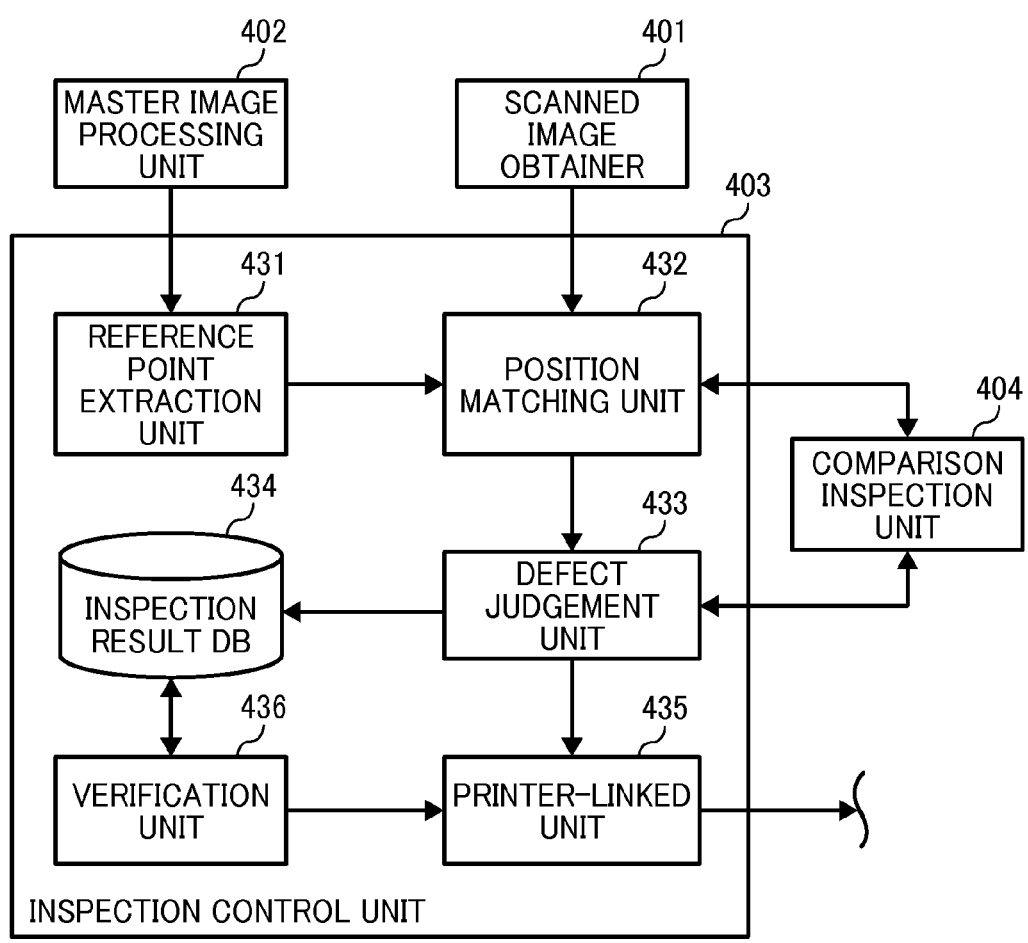
FIG. 6 is a block diagram of functional configuration of an inspection control unit according to an example embodiment.

A description is given of a functional configuration of the inspection control unit 403 according to an example embodiment. FIG. 6 is a block diagram of a functional configuration of the inspection control unit 403. As illustrated in FIG. 6, the inspection control unit 403 includes, for example, a reference point extraction unit 431, a position matching unit 432, a defect judgment unit 433, an inspection result database (DB) 434, a printer-linked unit 435, and a verification unit 436.

The reference point extraction unit 431 extracts a reference point used as a reference for position matching from a master image input from the master image processing unit 402. The reference point means, for example, a marking displayed on four corners of an image area in document, which is a target image formed by an image forming operation. If such marking is not present in an image, a pixel that can be used as a marking can be extracted by an image filter such as a corner extraction filter. The extraction of the reference point by the reference point extraction unit 431 will be described later.

The position matching unit 432 obtains the master image from the reference point extraction unit 431 and a scanned image from the scanned image obtaining unit 401. Based on the reference point extracted from the master image by the reference point extraction unit 431, the position matching unit 432 conducts position matching of the master image and the scanned image to compute positional deviation between the scanned image and the master image.

The position matching unit 432 extracts a given area of image around the reference point extracted from the master image, and also extracts a given area of image from the scanned image, which corresponds to a position of the given area of image extracted from the master image, and inputs the image area around the reference point of the master image, and the corresponding image area of the scanned image to the comparison inspection unit 404 to compute and obtain a total value of difference between the master image and the scanned image.

By shifting an extraction area of an image extracted from the scanned image in the vertical and horizontal directions, the position matching unit 432 repeats a process of obtaining computation results of total value of difference by the comparison inspection unit 404 for a plurality of times, in which the position matching unit 432 determines an extraction area of the scanned image corresponding to the minimum total value of difference as a position corresponding to the extraction area of the master image. The positional deviation of the extraction area of the scanned image and the extraction area of the master image determined by this process is determined as positional deviation of the reference point for the concerned image.

Figure 7:
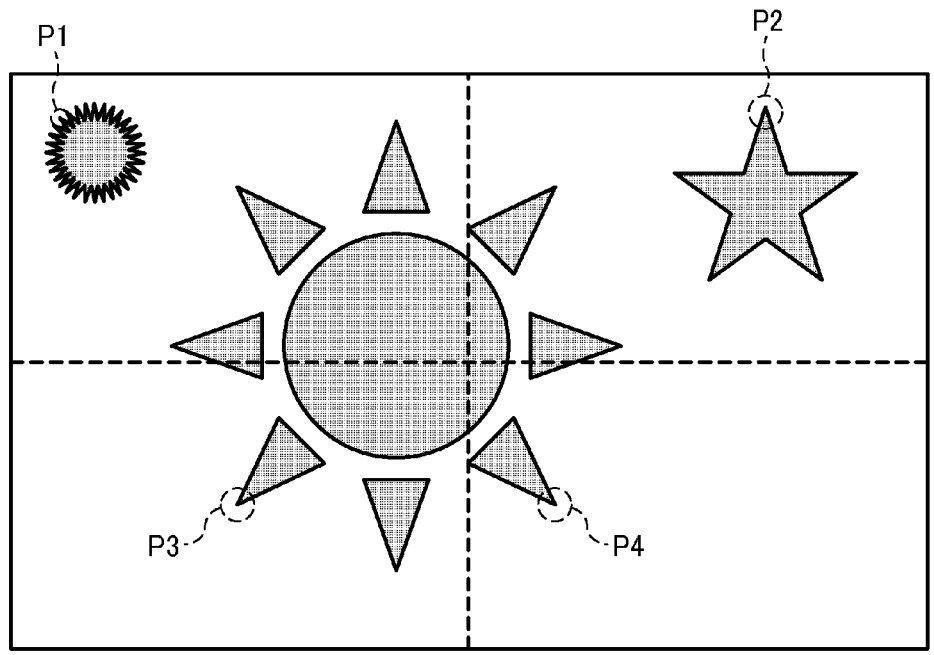
FIG. 7 is an example of position matching area according to an example embodiment.

As illustrated in FIG. 7, the position matching unit 432 evenly segments the master image into two areas in the vertical and horizontal directions to divide the master image into four position matching areas, and conducts position matching for each of the position matching areas, and the reference point extraction unit 431 extracts a reference point for each of the position matching areas.

As to the extraction process of the reference point, the reference point extraction unit 431 extracts one or more reference points from corner points extracted by a corner extraction filter. For example, the reference point extraction unit 431 extracts four points such as the most upper-left position (P1), the most lower-left position (P3), the most upper-right position (P2), the most lower-right position (P4) from the image as illustrated in FIG. 7. With this processing, as illustrated in FIG. 7, the reference point can be extracted for each of the four position matching areas prepared by evenly segmenting the master image into two areas in the vertical and horizontal directions.

In the example embodiment, the position matching is conducted for each of the position matching areas prepared by dividing the image, and a comparison inspection of image is conducted using a position matching result of each of the position matching areas. Compared to using one position matching result for an entire image, the comparison inspection using a position matching result of each of the position matching areas can be conducted more precisely in line with image distortion and image enlargement/reduction. In the example embodiment, it is determined whether position matching for each of the position matching areas is correct or not correct using a position matching result of each of the position matching areas.

The defect judgment unit 433 inputs the master image and the scanned image input from the position matching unit 432 to the comparison inspection unit 404, and obtains a difference value of the images used for a comparison inspection, in which the defect judgment unit 433 can function as an inspection result obtaining unit. A description is given of the comparison inspection of image by the defect judgment unit 433 and the comparison inspection unit 404 with reference to FIG. 8.

Figure 8:
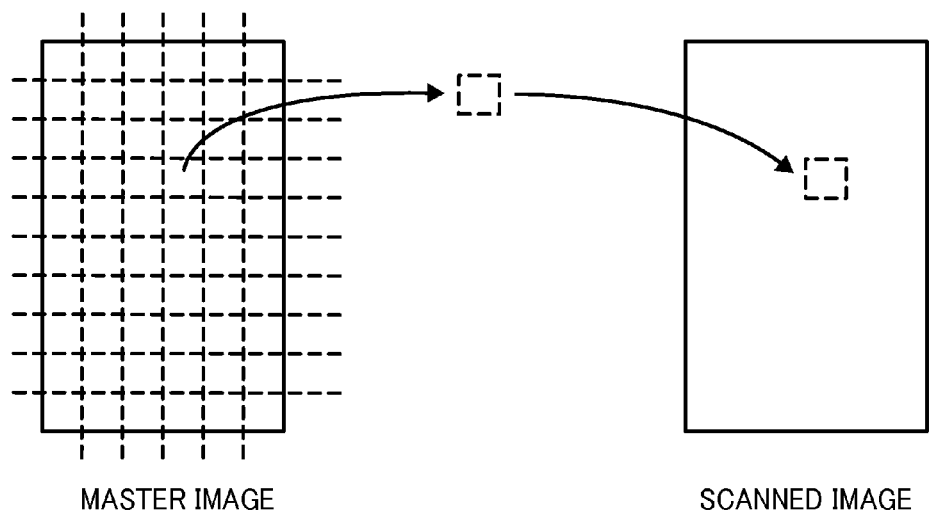
FIG. 8 is a scheme of comparison inspection according to an example embodiment.

When comparing the scanned image and the master image, as illustrated in FIG. 8, the defect judgment unit 433 divides the master image into a plurality of given areas (hereafter, comparison area), and inputs an image of each comparison area, and a corresponding image of the scanned image existing at a position corresponding to the comparison area of the master image to the comparison inspection unit 404. In this process, the corresponding image of the scanned image corresponding to the comparison area of the master image can be extracted based on a position matching result by the position matching unit 432. As above described, the position matching result becomes different for each of the position matching area where each comparison area belongs. With this processing, as illustrated in FIG. 8, the comparison inspection unit 404 superimposes a comparison area extracted from the master image to a corresponding image of the scanned image, and computes a difference value for each pixel.

Further, the defect judgment unit 433 repeats the same process by shifting a position of the scanned image to be superimposed to the comparison area of the master image in the vertical and horizontal directions, which means by shifting an image area extracted from the scanned image in the vertical and horizontal directions, the defect judgment unit 433 determines a position where a difference value computed by the comparison inspection unit 404 becomes the smallest as a correct superimposed position, and uses the computed smallest difference value as a comparison result. With this processing, the difference value can be computed based on the position matching of the scanned image and the master image.

When extracting an image area from the scanned image corresponding to one comparison area of the master image, which is a divided area as illustrated in FIG. 8, the defect judgment unit 433 extracts an image area from the scanned image based on the positional deviation amount obtained by the position matching unit 432. With this processing, when the comparison inspection is conducted by shifting the extraction area in the vertical and horizontal directions, described with reference to FIG. 8, the comparison inspection can be started under a condition after completing the position matching of the master image and the scanned image, with which the comparison inspection can be conducted with a relatively smaller number of computing times under the suitable condition of position matching.

Further, the difference value is not computed by superimposing an entire area of the master image to the scanned image, but the difference value can be computed for each one of the divided areas, with which computing load can be reduced as a whole. Further, even if a scale of the entire master image and a scale of the entire scanned image are different, by conducting the position matching after dividing an image into each area as illustrated in FIG. 8, an effect of different scale can be reduced.

The defect judgment unit 433 compares the computed difference value with a threshold value used for judging whether each pixel is defect, with which the defect judgment unit 433 can judge whether each pixel is defect or not. Specifically, when the difference value of one pixel is greater than a given threshold value, the one pixel is judged as defect. Further, instead of comparing the computed difference value and the threshold value for each pixel, the comparison can be conducted by comparing a total difference value for each comparison area (FIG. 8) and a threshold value set for the total difference value, in which defect judgment is conducted for each of comparison areas, and false detection due to minor difference of each pixel can be reduced.

Further, a size of the comparison area illustrated in FIG. 8 can be determined, for example, based on an area that the comparison inspection unit 404 configured with ASIC can conduct the comparison of pixel value at one time.

In the above described example embodiment, the comparison inspection unit 404 computes a difference value of pixel configuring the master image and pixel configuring the scanned image, and outputs the difference value of pixel, and the inspection control unit 403 compares the difference value and the threshold value but not limited hereto. For example, the comparison inspection unit 404 can conduct comparison of the difference value and the threshold value, and then a comparison result of the difference value and the threshold value, that is information indicating whether difference of each pixel configuring the scanned image and corresponding pixel configuring the master image exceeds a given threshold value, can be obtained by the inspection control unit 403.

Figures 9, 10:
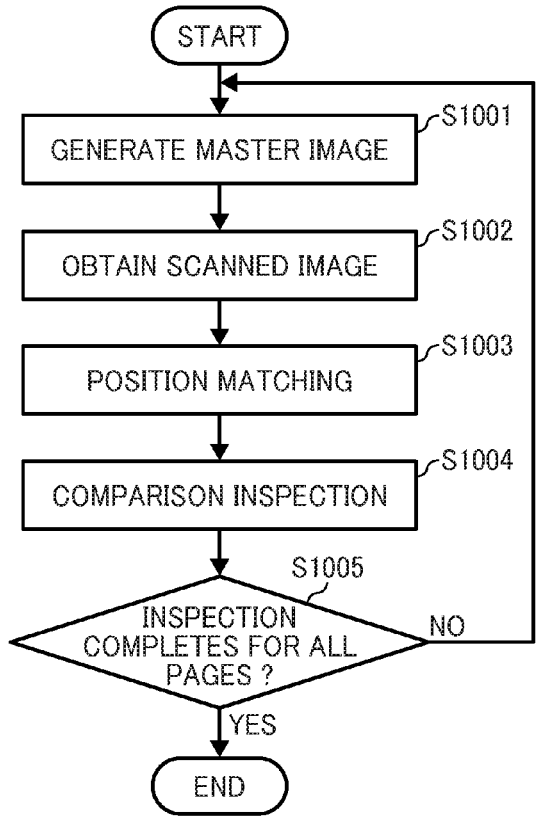
FIG. 9 is an example information of inspection result according to an example embodiment.
FIG. 10 is a flowchart showing the steps of an image inspection operation according to an example embodiment.

The defect judgment unit 433 stores a defect judgment result, obtained by the above described process, to the inspection result DB 434, in which the inspection result DB 434 can function as an inspection result obtaining unit, in which the defect judgment unit 433 can consolidate a plurality of pixels consecutively judged as defect in the vertical and horizontal directions as one collectively-recognized defect, and store information of the one collectively-recognized defect in the inspection result DB 434. FIG. 9 is an example information of one collectively-recognized defect stored in the inspection result DB 434.

As illustrated in FIG. 9, for example, the one collectively-recognized defect includes information of "defect ID, job ID, page number, defect position, defect area, average difference value, maximum difference value, and aspect ratio." The "defect ID" is an identifier to identify each of one collectively-recognized defect. The "job ID" is an identifier to identify a print job having an image detected with defect such as one collectively-recognized defect. The "page number" is a page number in a print job image detected with defect such as one collectively-recognized defect. The "defect position" is position where a defect such as one collectively-recognized defect is detected, which means coordinates of a defect detected in an image. Because one collectively-recognized defect is composed of pixels judged as defect consecutively by the defect judgment, the one collectively-recognized defect is composed of a plurality of pixels. Therefore, for example, coordinates of the most upper-left pixel among the pixels configuring one collectively-recognized defect may be used as a defect position.

The "defect area" is the number of pixels configuring one collectively-recognized defect. The "average difference value" is average of difference values of the plurality of pixels included in one collectively-recognized defect. The "maximum difference value" is a maximum difference value among difference values of the plurality of pixels included in one collectively-recognized defect. The "aspect ratio" is a value indicating a shape of one collectively-recognized defect such as a size ratio in the vertical and horizontal directions. The defect judgment unit 433 prepares information shown in FIG. 9 based on information obtained from the comparison inspection unit 404, and stores the prepared information in the inspection result DB 434.

When the defect judgment unit 433 determines a defect judgment for an inspection target page, the printer-linked unit 435 determines a print job stop and/or a re-printing, and transmits a print job stop request and/or a re-printing request to the engine control unit 202 of the engine controller 2. When transmitting the re-printing request, the printer-linked unit 435 reports a page number to be re-printed and a job ID number indicating a print job to be re-printed again. In this configuration, the engine control unit 202 conducts process for re-printing, which means the printer-linked unit 435 can function as a re-printing command unit.

The verification unit 436 analyzes information of an inspection result stored in the inspection result DB 434 to determine whether an image judged as defect is a defect actually occurring to an image, or is a false defect due to an error of position matching by the position matching unit 432. The detail of the verification unit 436 will be described later.

A description is given of an overall operation of the inspection apparatus 4 according to an example embodiment with reference to FIG. 10, which is a flowchart of an overall operation of the inspection apparatus 4. As shown in FIG. 10, when the inspection apparatus 4 conducts an image inspection operation, the master image processing unit 402 generates a master image based on bitmap data input from the bitmap transmitter 203 (S1001).

At the time around before or after the bitmap transmitter 203 transmits the bitmap data to the inspection apparatus 4, a sheet having formed with an image by the print engine 3 is transported inside the inspection apparatus 4, and a face of a sheet is scanned by the scanner 400, and the scanned image obtaining unit 401 obtains a scanned image (S1002).

When the scanned image obtaining unit 401 obtains the scanned image, the position matching unit 432 of the inspection control unit 403 controls the comparison inspection unit 404 to conduct a position matching process for the scanned image obtained by the scanned image obtaining unit 401 and the master image generated by the master image processing unit 402 (S1003). In the example embodiment, it is determined whether the process at S1003 is correctly completed or not at a later stage.

When the position matching process completes, the inspection control unit 403 conducts a comparison inspection for the master image and the scanned image using positional deviation of the master image and the scanned image obtained at S1003 (S1004). The comparison process of the scanned image and the master image can be conducted by conducting position matching for each of divided areas, prepared by dividing an image into a plurality of given areas as described above.

The defect judgment unit 433 of the inspection control unit 403 stores information shown in FIG. 9 to the inspection result DB 434. Further, based on information of such inspection result, the printer-linked unit 435 displays a defect judgment result on a display unit such as the LCD 60 connected to the inspection apparatus 4, or transmits the defect judgment result to the engine controller 2 via a network.

The inspection control unit 403 repeats the process from S1001 to S1004 until the inspection completes for all pages included in a print job (S1005: No). When the process from S1001 completes for all pages in included in the print job (S1005: Yes), the process ends. With this processing, the overall process for the image inspection operation of the example embodiment ends.

In the example embodiment, when one page is judged as defect, it is determined whether the judgment result is caused by defect in image, or caused by failure of the position matching by the position matching unit 432. A description is given of determination scheme of judgment result with reference to FIGS. 11A and 11B.

Figure 11A:
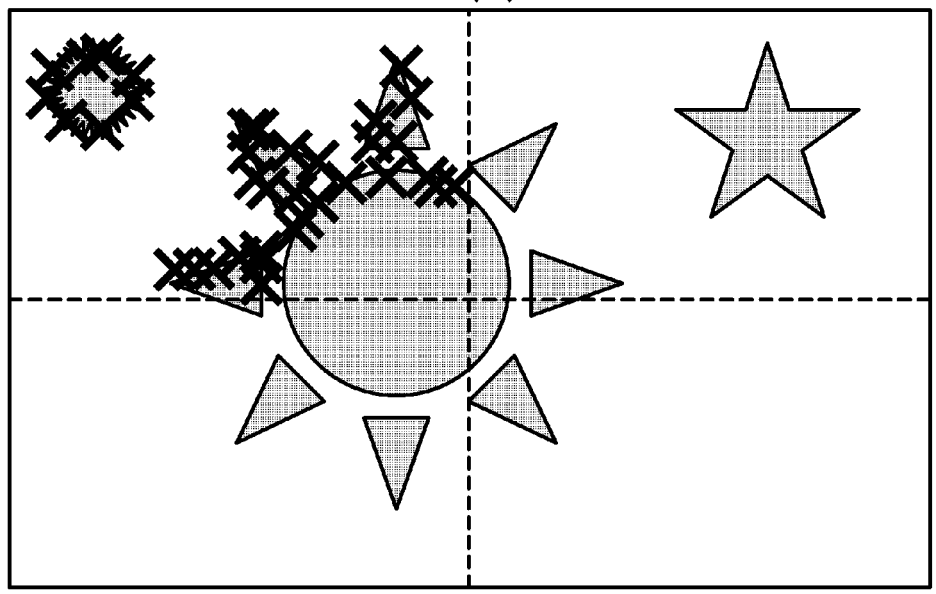
FIGS. 11A and 11B are examples of defect pattern according to an example embodiment.
Figure 11B:
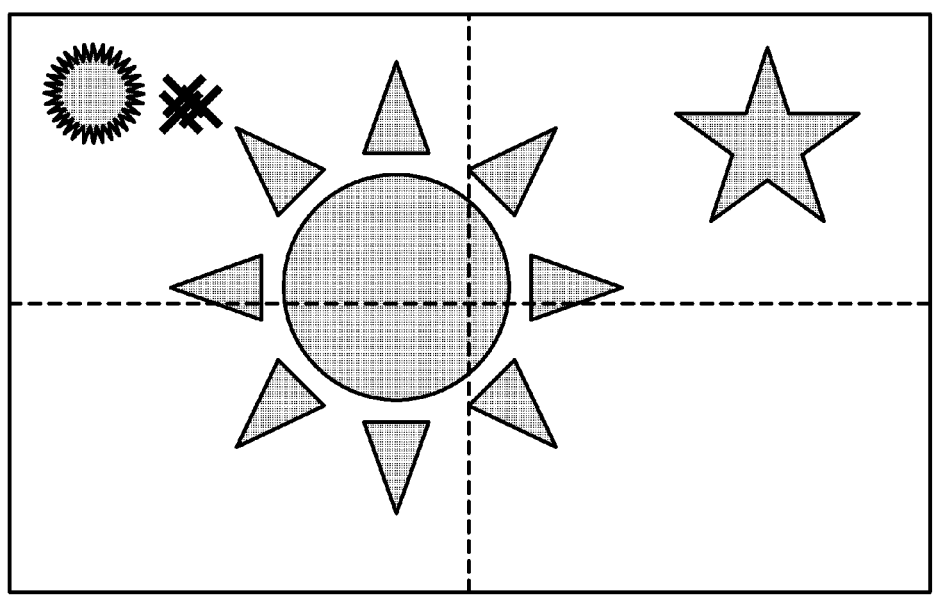

FIG. 11A is an example view indicating a defect judgment result when the position matching for the upper-left position matching area is failed for an image illustrated in FIG. 7, and FIG. 11B is an example view indicating a defect judgment result when the position matching for the upper-left position matching area is success and defect occurs in an image for an image illustrated in FIG. 7. As illustrated in FIG. 11B, when defects occur in the image, the defect judgment result appears at a local portion where the defect occurs.

By contrast, when the position matching is failed, as illustrated in FIG. 11A, pixels at different positions in the scanned image and the master image are compared and then the difference value are computed for a position matching area where failure of the position matching occurs, in which many pixels in the entire area of the position matching area are judged as defect.

As illustrated in FIG. 11A, judgment of defect pixel caused by this positional deviation occurs prominently at a boundary portion such as an edge portion of image where brightness, chroma, and/or hue of pixels greatly changes. As to a solid portion and a portion where color changes gradually, even if pixels of the scanned image and pixels of the master image are compared under a condition of several pixels deviation, difference value of pixel can be small, and thereby probability that the solid portion and portion where color changes gradually are not judged as defect becomes high. By contrast, as to the edge portion of image, because pixel values greatly change, difference value of pixel becomes greater even if one pixel is deviated.

As above described, when the position matching is failed, defect judgment number increases too great for a specific position matching area, and defect judgment disperses in the entire of position matching area, and further, defect judgment concentrates to the edge portion of image. In the example embodiment, based on such properties of defect judgment caused by the failure of the position matching, the inspection apparatus 4 conducts a verification operation to determine whether the defect judgment result is caused by occurrence of an actual defect or is caused by failure of the position matching.

Figure 12:
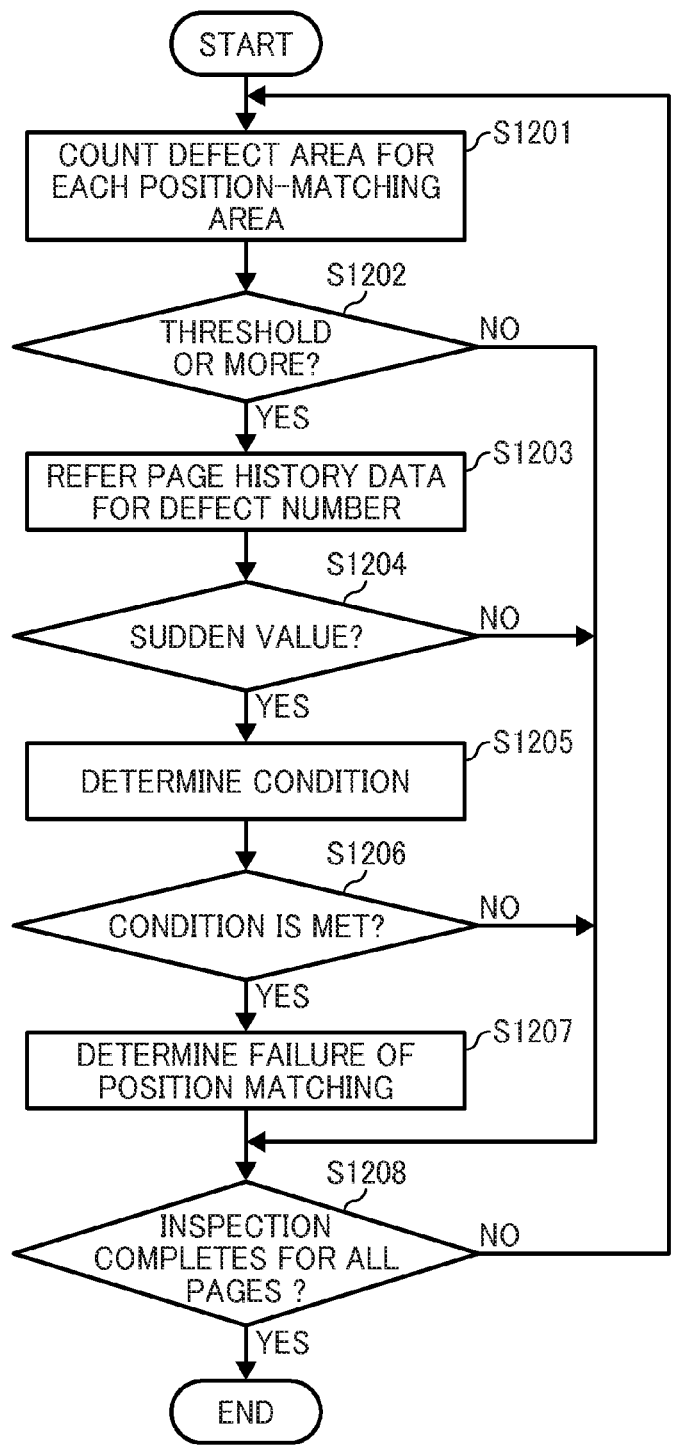
FIG. 12 is a flowchart showing the steps of a verification operation according to an example embodiment.

FIG. 12 is a flowchart showing the steps of verification operation of defect judgment according to an example embodiment. Before starting the verification operation of FIG. 12, an inspection result for a plurality of pages of at least one print job is stored in the inspection result DB 434. When the verification operation is started, the verification unit 436 refers information of one page based on "job ID" and "page number" stored in the inspection result DB 434, and counts a defect area for each of the position matching areas (S1201).

The verification unit 436 has coordinate information to define the position matching area illustrated in FIG. 7. Based on this coordinate information and defect position (FIG. 9), the verification unit 436 sorts each of defects to conduct counting of a defect area for each of the position matching areas. Upon completing the counting of defect area for each of the position matching areas, the verification unit 436 compares the counting result with a threshold value used for determining whether a greater number of defects occur within a specific position matching area as illustrated in FIG. 11A (S1202).

Figure 13A:
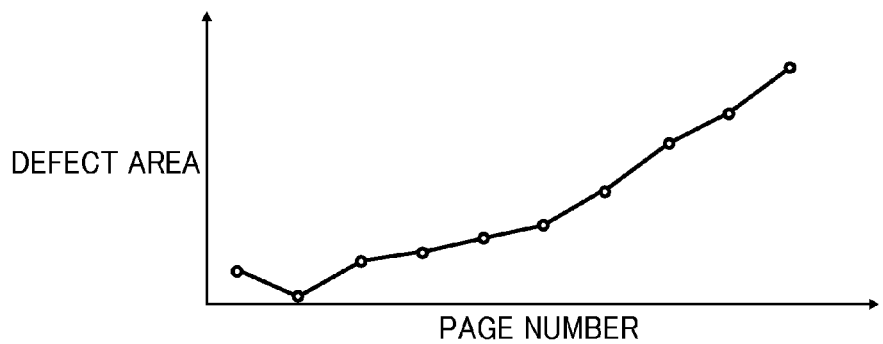
FIGS. 13A, 13B, and 13C are examples of page history data for defect number.
Figure 13B:
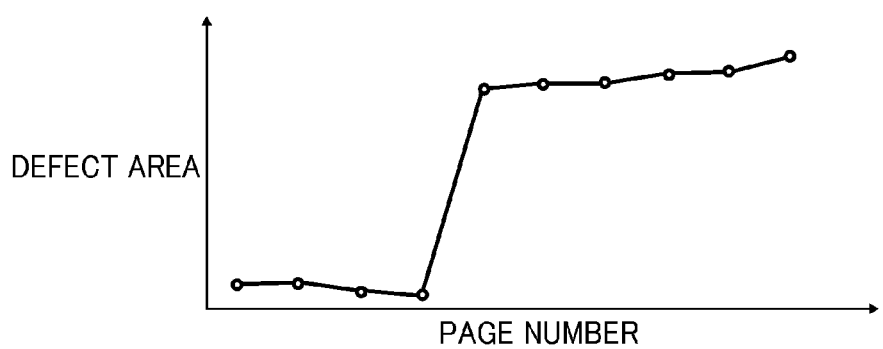
Figure 13C:
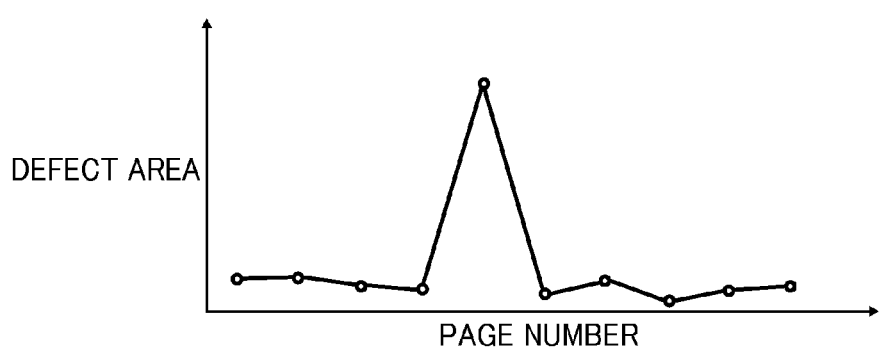

If the counting result of defect area for any one of four position matching areas does not exceed the threshold value (S1202: No), the verification unit 436 determines that no probability of failed position matching, and proceeds to S1208. In contrast, if the counting result of defect area exceeds the threshold value (S1202: Yes), the verification unit 436 determines that probability of failed position matching exists, and then refers to page history data for defect number (S1203). The page history data for defect number is data of counted number of defect area in the order of page number. FIGS. 13A to 13C are examples of page history data for defect number.

FIG. 13A is data that defect area increases as page number increases. In this case, defect area may increase due to deterioration of the print engine 3 and the scanner 400 over the time with higher probability. FIG. 13B is data that defect area increases abruptly at one point as page number increases and an increase of defect area may continue thereafter. In this case, defect area may increase abruptly due to occurrence of major defect or malfunction occurring to the print engine 3 and the scanner 400 with higher probability.

FIG. 13C is data that defect area increases only at a specific page as page number increases, and the defect area is stable before and after the specific page. Therefore, it is difficult to assume that defect or malfunction occurs to the print engine 3 and the scanner 400, but it is assumed that position matching process may be failed with higher probability.

By referring the page history data for defect number, the verification unit 436 determines whether currently being determined page is a page corresponding to sudden increase of defect area illustrated in FIG. 13C (S1204). For example, the process at S1204 can be conducted by the verification unit 436 as follows. The verification unit 436 determines whether a difference value of a total value of defect area of a currently-being determined page, and a total value of defect area of each of other page exceeds a given threshold value.

If the verification unit 436 determines that sudden increase of defect area does not occur (S1204: No), the verification unit 436 determines that no probability of failed position matching, and then proceeds to the process of S1208. In contrast, if the verification unit 436 determines that sudden increase of defect area occurs (S1204: Yes), the verification unit 436 determines whether the currently-being determined page corresponds to a specific condition of defect-occurring case when the position matching is failed as described with reference to FIG. 11A (S1205, S1206). As above described, at S1205 and S1206, the verification unit 436 conducts determination for a specific position matching area such as whether defect judgment number increases too great, whether defect judgment is dispersed in the entire of position matching area, or whether defect judgment concentrates at the edge portion of image.

When to determine whether the defect judgment number increases too great at the specific position matching area, at S1202, the verification unit 436 compares a counting result of defect area of one position matching area exceeding the threshold value, and a counting result of defect area of other position matching area, in which the verification unit 436 computes a difference value of the counting result of defect area of one position matching area exceeding the threshold value, and the counting result of defect area of other position matching area. If the difference value exceeds the threshold value, which means if defect amount of the specific position matching area where counted defect amount exceeds the threshold value is greater than defect amount of other position matching area for a given amount or more, the verification unit 436 determines that defect judgment number at the specific position matching area increases too great.

Further, the verification unit 436 can determine whether defect area of only one position matching area exceeds the threshold value. Specifically, when defect concentrates in one specific position matching area among a plurality of position matching areas (i.e., divided areas), it can determine that position matching is failed at the one position matching area.

This determination is not limited to only one position matching area of the plurality of position matching areas, but can be applied to some position matching areas of the plurality of position matching areas. For example, in a case of using four position matching areas (see FIG. 7) of the example embodiment, defect amount may be great for two position matching areas, and defect amount may be small for other two position matching areas, in which it can determine that position matching is failed at the two position matching areas having the greater defect amount. Further, in this determination, a case comparing counting results of defect area of different position matching areas, or another case determining whether a counting result of defect area exceeds a threshold value can be applied, or both of the cases can be applied.

When to determine whether defect judgment is dispersed in the entire of position matching area, at S1202, the verification unit 436 determines dispersion of "defect position" and size of "defect area" included in an inspection result obtained for a position matching area having defect area exceeding a threshold value. Specifically, if defect position occurring in the concerned position matching area is dispersed at a level greater than a given reference level, or defect area occurring in the concerned position matching area is greater than a given reference level, it can determine that defect judgment is dispersed in the entire of position matching area.

When to determine whether defect judgment concentrates at the edge portion of image, at S1202, the verification unit 436 applies an edge extraction filter to an image included in the concerned position matching area having defect area exceeding a threshold value to extract coordinates of the edge, and determines a positional relationship of coordinates of the extracted edge and "defect position" of the judged defect. Specifically, if the "defect position" of the judged-defect concentrates near the coordinates of the extracted edge, it can determine that defect judgment concentrates at the edge portion of image.

As above described, the determination at S1205 is conducted whether defect judgment number increases too great at a specific position matching area, whether defect judgment is dispersed in the entire of position matching area, or whether defect judgment concentrates at the edge portion of image, but it is not required to determine all of these cases. For example, only one of these, or some of these can be selectively determined.

When the currently-being determined page does not correspond to the condition (S1206: No), the verification unit 436 determines that no probability of failure of the position matching, and proceeds to the process at S1208. In contrast, when the currently-being determined page corresponds to the condition (S1206: Yes), the verification unit 436 determines that defect does not occur to the currently-being determined page, but determines that defect may be false detection caused by failure of the position matching with some probability (S1207).

At S1207, the verification unit 436 adds a flag to determination result information of page having probability of false detection due to failure of the position matching, wherein the judgment result information includes determination result for to each of pages. FIG. 14 is an example of determination result information of each page added with the flag. In a case of FIG. 14, "1" is flag information indicating that it is determined that probability of failure of the position matching exists.

When a plurality of conditions is determined at S1206, the determination can be conducted using all of determination conditions, at least one condition, or two or more conditions, in which it can determine whether all of the determination conditions are satisfied, at least one condition is satisfied, or two or more conditions are satisfied.

The verification unit 436 repeats the process from S1201 to S1207 for all pages having inspection results stored in the inspection result DB 434 (S1208; No). When the process from S1201 completes for all pages (S1208: Yes), the process ends. With this processing, the verification operation of defect judgment ends.

The image inspection system including the inspection apparatus 4 accumulates information shown in FIG. 9 as information of inspection result of image, and uses a feature of defect which may occur with higher probability when position matching is failed. With reference to this feature of defect, the image inspection system analyzes accumulated information to determine whether defect is falsely detected as defect due to failure of the position matching.

More specifically, when conducting an inspection of the scanned image, position matching is conducted for each of a plurality of areas, and then a comparison inspection is conducted for the scanned image and the master image. When a counting result of defect amount of each of the plurality of areas is a given threshold value or more, and occurring defect pattern matches the above described pre-set condition, it is determined that a defect judgment result is a false detection caused by failure of the position matching. With this configuration, as to the image inspection apparatus of the above described example embodiment that inspects a printed sheet by comparing the scanned image generated by scanning the sheet and the inspection reference image, it can determine whether defect judgment is caused by failed matching of position.

The above described example embodiment describes the operation until it is determined that position matching is failed. Further, when position matching is failed, a re-inspection can be conducted subsequently after determining the failure of the position matching. A description is given of a re-inspection with reference to FIG. 15, which is a flowchart showing the steps of an operation of re-inspection after conducting the verification operation. The verification unit 436 conducts the verification operation shown in FIG. 12 (S1501). If it is determined that failure of the position matching is not detected (S1502: No), the verification unit 436 ends the process.

At S1502, the verification unit 436 refers information of verification result (FIG. 14) to check a page having flag information of "1" indicating "position matching is failed." If it is determined that failure of the position matching is detected (S1502: Yes), the verification unit 436 determines whether a re-inspection is already conducted for the page having defect caused by failure of the position matching (S1503). If the re-inspection is already conducted (S1503: No), the verification unit 436 determines that successful determination by an automatic re-inspection is impossible, and the verification unit 436 ends the process. If the re-inspection is not yet conducted (i.e., before the re-inspection) (S1503: Yes), the verification unit 436 obtains the master image and the scanned image for a target page for conducting the re-inspection (S1504).

To conduct the process at S1504 in the re-inspection process shown in FIG. 15, the master image and the scanned image for the concerned page, already determined having defect by the comparison inspection in the image inspection operation shown in FIG. 10, are required to be stored. Therefore, the defect judgment unit 433 stores data of the master image and the scanned image for the page which is determined defect by the comparison inspection in a storage medium such as the HDD 40. Further, coordinates information of the reference point extracted by the reference point extraction unit 431 is also stored.

Upon reading the master image and the scanned image, and coordinates of the reference point of the target page, as same as S1003 of FIG. 10, the verification unit 436 instructs the position matching unit 432 to conduct a position matching process (S1505). As described above, in the position matching process, a given image area around the reference point is extracted from the master image, and a position in the scanned image corresponding to the given image area is searched.

As to the position matching at S1505 (i.e., position matching for the re-inspection), an extraction size of an area extracted around the reference point is enlarged. For example, when a position matching is conducted for a standard image inspection, 30 pixels are extracted in the upper, lower, left, and right about the reference point (i.e., center point) from the master image (i.e., total of 61×61 pixels are extracted), and when a position matching is conducted for re-inspection, 50 pixels are extracted in the upper, lower, left, and right about the reference point (i.e., center point) from the master image (i.e., total of 101×101 pixels are extracted), and position of the corresponding image in the scanned image is searched. With this configuration, the position matching can be determined based on a more enlarged image area, with which probability that different image portions are matched by chance can be reduced, and position matching can be conducted more correctly.

As above described, in the position matching process and the image inspection process, an image size extracted from a master image and a scanned image for a comparison process by the comparison inspection unit 404 can be determined by the specification of the comparison inspection unit 404 configured with a hardware such as ASIC. Therefore, as to the position matching process in the standard image inspection, an image size extracted from around the reference point is typically a size limited by capability of the comparison inspection unit 404. For example, as to the position matching process in the standard image inspection, it is required to set processing speed such as image scanning speed and image processing speed in view of sheet transport speed in a printer or other hardware configuration limitation, which means capability of hardware configuration such as the printer and the comparison inspection unit 404 of the inspection apparatus limits the image size extracted from around the reference point.

In contrast, the operation shown in FIG. 15 is the re-inspection operation, in which it is not required to consider a time span for each page such as time required for an image forming operation by the print engine 3 for outputting a printed sheet, and time required for scanning the sheet by the scanner 400 for generating a scanned image, which means the verification operation can be conducted without consideration to the time span (e.g., consideration of time limitation by the capability of hardware configuration is not required). Therefore, position matching for each page is not required to be conducted at faster speed for the position matching at S1505 (FIG. 15), in which processing is not conducted by the comparison inspection unit 404, but processing can be conducted by software, with which position matching can be conducted with an image size greater than a size limited by capability of the comparison inspection unit 404.

Upon completing the position matching process, in response to a request from the verification unit 436, the defect judgment unit 433 conducts a comparison inspection based on the position matching result (S1506) as same as S1004 of FIG. 10. The verification unit 436 repeats the process from S1504 for all pages judged as defect (S1507: No), and when the verification unit 436 completes the process for all pages (S1507: Yes), the verification operation (FIG. 12) is conducted again (S1501). Then, the verification unit 436 ends the process depending on a determination result at S1502 or S1503. With this configuration, the re-inspection based on the verification result completes.

As above described, when occurrence of positional deviation is determined by the verification operation, an image area used as a key for position matching, that is an extraction area extracted from around the reference point, can be enlarged to conduct the position matching again. With this configuration, probability of conducting false position matching can be reduced. Further, other than using an image area as a key, an extraction area set by shifting an image in the vertical and horizontal directions in the scanned image can be enlarged. With this configuration, position matching can be conducted more correctly, and false detection of defect caused by failure of the position matching can be detected, and false detection of defect can be automatically removed or cancelled.

At S1505 in the above example embodiment, precision of position matching can be enhanced by using more images as a key compared to position matching process for the standard image inspection. Further, position matching process can be correctly conductable with higher probability by conducting a position matching process different from the standard image inspection. For example, a position matching process using different algorism can be conducted, in which the different algorisms for position matching is, for example, SIFT (scale-invariant feature transform), FAST (features from accelerated segment test) or the like.

With this configuration, a position matching that is failed by the standard image inspection can be conducted successfully with higher probability. For example, if position matching is not conducted correctly, and if a comparison inspection is conducted under a condition of false position matching, each pixel is compared under a condition that the master image and the scanned image are deviated, in which the scanned image is determined as defect. To prevent this false detection of defect, when it is determined as defect, it is preferable to check whether the detected defect is an actual defect, or not an actual defect but caused by a false position matching. However, if such checking were to be performed through visual inspection by an operator, a burden of the operator greatly increases. As described above, determination of whether defect occurring to the scanned image is caused by failure of position matching may be correctly made.

Further, when a position matching process is conducted precisely compared to the standard image inspection, the position matching process is conducted with time longer than time of the standard image inspection.

As to the above described image inspection apparatus for inspecting a printed product by comparing a scanned image generated by scanning the printed product and an inspection reference image, defect caused by failure of the position matching can be determined.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

Numerous additional modifications and variations are possible in light of the above teachings. It is therefore to be understood that, within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An apparatus for verifying an inspection result of a scanned image generated by scanning an image printed on a sheet, the apparatus comprising:
    an inspection result obtaining unit to obtain inspection result information indicating defect amount and defect position in the scanned image, from an inspection result of defect judgment of the scanned image with respect to an inspection reference image, the defect judgment being performed through dividing at least one of the scanned image and the inspection reference image into a plurality of areas and conducting position matching for each of the areas; and
    a verification unit to
    count defect amount occurring to the scanned image for each of the plurality of areas based on the obtained inspection result information,
    determine whether a defect pattern occurring to the scanned image matches a pre-set condition corresponding to a false defect detection condition causable by failure of the position matching, and
    determine that defect occurring to the scanned image is a false detection caused by failure of the position matching when the counted defect amount for each of the areas is a pre-set threshold value or more, and the defect pattern occurring to the scanned image matches the false defect detection condition,
    wherein the verification unit refers to the inspection result information including inspection result information of a plurality of pages, and the verification unit determines defect occurring to one page including an area having the defect amount of pre-set threshold value or more is a false detection caused by failure of the position matching when the one page including the area having the defect amount of pre-set threshold value or more is a part of the plurality of pages.

2. The apparatus of claim 1, wherein the verification unit determines whether one area having the defect amount of pre-set threshold value or more is a part of the plurality of areas as a condition of the false defect detection condition.

3. The apparatus of claim 1, wherein the verification unit determines whether the defect amount of one area having the defect amount of pre-set threshold value or more is greater than a defect amount of other areas for a given level or more as a condition of the false detection.

4. The image inspection result determination apparatus of claim 1, wherein the verification unit determines whether defects in one area having the defect amount of pre-set threshold value or more are dispersed in the one area entirely as a condition of the false defect detection.

5. The apparatus of claim 1, wherein the verification unit determines whether defects in one area having the defect amount of pre-set threshold value or more exist near an edge of an image in the one area as a condition of the false defect detection.

6. The apparatus of claim 1, wherein when the verification unit determines that defect occurring to the scanned image is a false detection caused by failure of the position matching, the verification unit instructs to re-inspect the scanned image determined as the false detection, using a position matching process, different from the position matching previously conducted in the inspection of the scanned image.

7. An image inspection system, comprising:
    a scanned image obtaining unit to obtain a scanned image generated by scanning an image printed on a sheet;
    an inspection reference image generator to generate an inspection reference image as a master image, the master image to be used for an inspection of the scanned image based on information of to-be-printed image;
    a position matching unit to divide at least one of the master image and the scanned image into a plurality of areas to conduct position matching for the master image and the scanned image for the divided each of the areas;
    an inspection result processing unit to store an inspection result of defect judgment of the scanned image based on difference of the master image and the scanned image in a storage area;
    an inspection result obtaining unit to obtain inspection result information indicating defect amount and defect position in the scanned image from the inspection result; and
    a verification unit to count defect amount occurring to the scanned image for each of the areas based on the obtained inspection result information to generate a first verification result,
    to determine whether a defect pattern occurring to the scanned image matches a pre-set condition corresponding to a false defect detection condition causable by failure of the position matching to generate a second verification result, and
    to determine that defect occurring to the scanned image is a false detection caused by failure of the position matching, when the first verification result indicates that the counted defect amount for each of the areas is a pre-set threshold value or more, and the second verification result indicates that the defect pattern occurring to the scanned image matches the false defect detection condition,
    wherein the verification unit refers to the inspection result information including inspection result information of a plurality of pages, and the verification unit determines defect occurring to one page including an area having the defect amount of pre-set threshold value or more is a false detection caused by failure of the position matching when the one page including the area having the defect amount of pre-set threshold value or more is a part of the plurality of pages.

8. A method of verifying an inspection result of a scanned image generated by scanning an image printed on a sheet, the method comprising:
    obtaining inspection result information indicating defect amount and defect position in the scanned image, from an inspection result of defect judgment of the scanned image with respect to an inspection reference image, the defect judgment being performed through dividing at least one of the scanned image and the inspection reference image into a plurality of areas and conducting position matching for each of the areas;

counting defect amount occurring to the scanned image for each of the areas based on the obtained inspection result information;

determining whether a defect pattern occurring to the scanned image matches a pre-set condition corresponding to a false defect detection condition causable by failure of the position matching;

determining that defect occurring to the scanned image is a false detection caused by failure of the position matching when the counted defect amount for each of the areas is a pre-set threshold value or more, and the defect pattern occurring to the scanned image matches the false defect detection condition referring to the inspection result information including inspection result information of a plurality of pages; and determining defect occurring to one page including an area having the defect amount of pre-set threshold value or more is a false detection caused by failure of the position matching when the one page including the area having the defect amount of pre-set threshold value or more is a part of the plurality of pages.

9. A non-transitory computer-readable storage medium storing a program that, when executed by a computer having a processing circuit, causes the computer to execute the method of claim 8.

\* \* \* \* \*